United States Patent
Fang et al.

(10) Patent No.: US 12,418,247 B2
(45) Date of Patent: Sep. 16, 2025

(54) MODULATION METHOD FOR DIRECT CURRENT (DC) COUPLING CONVERTER WITH LESS DC VOLTAGE SENSORS

(71) Applicants: State Grid Chongqing Electric Power Co. Electric Power Research Institute, Chongqing (CN); State Grid Corporation of China, Beijing (CN)

(72) Inventors: Hui Fang, Chongqing (CN); Jingsen Zhou, Chongqing (CN); Yongtao Chen, Chongqing (CN); Fan Mu, Chongqing (CN); Shengyi Zhu, Chongqing (CN); Cheng Wang, Jiangsu (CN); Lei Li, Jiangsu (CN); Hongji Xiang, Chongqing (CN); Yanan Yu, Chongqing (CN); Qiang Xiao, Chongqing (CN); Lining Hu, Chongqing (CN); Zhongyi Wen, Chongqing (CN)

(73) Assignees: State Grid Chongqing Electric Power Co. Electric Power Research Institute, Chongqing (CN); State Grid Corporation of China, Beijing (CN)

( * ) Notice: Subject to any disclaimer, the term of this patent is extended or adjusted under 35 U.S.C. 154(b) by 0 days.

(21) Appl. No.: 17/925,324

(22) PCT Filed: Sep. 26, 2022

(86) PCT No.: PCT/CN2022/121236
§ 371 (c)(1),
(2) Date: Nov. 15, 2022

(87) PCT Pub. No.: WO2024/027001
PCT Pub. Date: Feb. 8, 2024

(65) Prior Publication Data
US 2024/0258916 A1    Aug. 1, 2024

(30) Foreign Application Priority Data

Aug. 4, 2022    (CN) .......................... 202210931281.7

(51) Int. Cl.
    *H02M 7/483*    (2007.01)
(52) U.S. Cl.
    CPC .............................. *H02M 7/4835* (2021.05)
(58) Field of Classification Search
    CPC .................................................. H02M 7/4835
    See application file for complete search history.

(56) References Cited

FOREIGN PATENT DOCUMENTS

CN    111342690 A    6/2020

OTHER PUBLICATIONS

G. Konstantinou, H. R. Wickramasinghe, C. D. Townsend, S. Ceballos and J. Pou, "Estimation Methods and Sensor Reduction in Modular Multilevel Converters: A Review," 2018 8th International Conference on Power and Energy Systems (ICPES), Colombo, Sri Lanka, 2018, pp. 23-28 (Year: 2018).*

(Continued)

*Primary Examiner* — Peter M Novak

(57) ABSTRACT

A modulation method for a direct current (DC) coupling converter with less DC voltage sensors includes: obtaining a voltage modulated wave $v_r^*$ and a current reference value $i_g^*$ of the DC coupling converter; performing determination on the voltage modulated wave $v_r^*$ and the current reference value $i_g^*$, and determining a switch state of the DC coupling converter based on a result of the determination; and when a DC voltage sensor of an electrolytic capacitor of an intermediate power module is removed, modulating a DC voltage sensor based on the voltage modulated wave $v_r^*$ and a difference between DC voltages on electrolytic capacitors of the other two power modules. When the intermediate DC-side voltage sensor is removed, DC voltages of various modules of a converter system of a DC coupling power unit (Continued)

can still be balanced, and quality of a grid-connected current is not affected by a fault.

4 Claims, 8 Drawing Sheets

(56) References Cited

OTHER PUBLICATIONS

Machine translation of CN 113429690 (Year: 2020).*

* cited by examiner

Obtain a voltage modulated wave $v_r^*$ and a current reference value $i_g^*$

Perform range division on the $v_r^*$ and the $i_g^*$, and determine a switch state of a DC coupled converter based on a division result When a DC voltage sensor of an electrolytic capacitor in an intermediate power module is removed, modulate a DC voltage sensor based on the voltage modulated wave $v_r^*$ and a difference between DC voltages on electrolytic capacitors of the other two power modules

FIG. 1

MODULATION METHOD FOR DIRECT CURRENT (DC) COUPLING CONVERTER WITH LESS DC VOLTAGE SENSORS

CROSS REFERENCE TO RELATED APPLICATION

The present application claims the benefit of Chinese Patent Application No. 202210931281.7 filed on Aug. 4, 2022, the contents of which are hereby incorporated by reference.

TECHNICAL FIELD

The present disclosure relates to the technical field of modular multilevel power electronic converters and control thereof, and specifically, to a modulation method for a direct current (DC) coupling converter with less DC voltage sensors.

BACKGROUND

A cascaded H-bridge is a typical cascaded multilevel converter. High power output quality of the cascaded H-bridge not only avoids tedious filtering on output in a grid connection application, but also reduces torque ripples and insulation stress in a motor drive system. Compared with a traditional two-level or three-level converter, a cascaded H-bridge converter is easy to extend an output level due to the modular structure thereof, and can be connected to a medium/high-voltage power grid without a bulky power frequency transformer. The modular structure is one of ideal structures of high-power converters for medium and high voltage occasions, such as a high-power battery energy storage system, a large-capacity motor drive, and a large photovoltaic (PV) power generation system.

However, as more H-bridge modules are cascaded, a quantity of DC voltage sensors used will increases exponentially. A cost of the voltage sensor is one of main costs of this kind of multi-module converter, but existing control or modulation technologies do not disclose how to achieve stable operation of the cascaded H-bridge when there are less DC-side voltage sensors.

SUMMARY

The present disclosure is intended to provide a modulation method for a DC coupling converter with less DC voltage sensors. When a DC-side voltage sensor of an intermediate module is removed, a converter system of a DC coupling power unit can operate normally, so as to achieve stable operation of a cascaded H-bridge when there are less DC-side voltage sensors.

The present disclosure adopts the following technical solutions:

The present disclosure provides a modulation method for a DC coupling converter with less DC voltage sensors, where the DC coupling converter includes three power modules, and the modulation method specifically includes the following steps:

step 1: obtaining a voltage modulated wave $v_r^*$ and a current reference value $i_g^*$ of the DC coupling converter;

step 2: performing determination on the voltage modulated wave $v_r^*$ and the current reference value $i_g^*$ in step 1, and determining a switch state of the DC coupling converter based on a result of the determination; and step 3: when a DC voltage sensor of an electrolytic capacitor of an intermediate power module is removed, modulating a DC voltage sensor based on the voltage modulated wave $v_r^*$ and a difference between DC voltages on electrolytic capacitors of the other two power modules.

In step 1, the obtaining a voltage modulated wave $v_r^*$ and a current reference value $i_g^*$ specifically includes:

step 11: obtaining a phase signal $\theta$ of a power grid by performing phase locking on a voltage $v_g$ of the power grid, wherein the three power modules of the DC coupling converter are a power module 1, a power module 2, and a power module 3, and DC-side voltages of the power module 1, the power module 2, and the power module 3 are $v_{dc1}$, $v_{dc2}$, and $v_{dc3}$ respectively;

step 12: performing $\alpha\beta/dq$ transformation on phase signals $\theta$ of the voltage $v_g$ of the power grid and a current $i_g$ of the power grid to obtain an active component $v_d$ and a reactive component $v_q$ of the $v_g$, and an active component ia and a reactive component $i_q$ of the $i_g$;

step 13: converging, by an average DC voltage control loop of a DC link of the DC coupling converter, an average value $v_{dcavg}$ of an outer loop voltage to a reference value $v_{dcref}$ after performing a subtraction on the reference value $v_{dcref}$ and the average value $_{dcavg}$, obtaining, by using a proportional Integral (PI) controller, a reference value $i_{dref}$ of the active component of the current $i_g$ of the power grid; and obtaining the current reference value $i_g^*$ after making the $i_{dref}$ and a phase of the power grid sinusoidal;

step 14: after performing a differential operation on the $i_{dref}$ and the $i_d$, obtaining an active power error $i_{derr}$ of the current by using the PI controller, and adding up the $i_{derr}$, the $v_d$, and $i_q^*\omega L$ to obtain a d-axis component $v_{dref}$ of the voltage modulated wave, wherein $\omega$ represents an angular frequency of the power grid, and L represents grid-connected filtering inductance;

step 15: obtaining, by using the IP controller, a reactive power error $i_{qerr}$ of the current based on a difference between $i_{qref}$ and $i_g$, and adding up the $i_{qerr}$, the $v_q$, and ia*$\omega$L to obtain a q-axis component $v_{qref}$ of the voltage modulated wave; and step 16: performing $dq/\alpha\beta$ transformation on the $v_{dref}$ and the $v_{qref}$ to obtain the voltage modulated wave $v_r^*$.

In step 2, the performing determination on the voltage modulated wave $v_r^*$ and the current reference value $i_g^*$, and determining a switch state of the DC coupling converter based on a result of the determination specifically includes:

when $v_r^*>0$ and $i_g^*>0$, determining that the $v_r^*$ and the $i_g^*$ are in an operation range I;

when $v_r^*<0$ and $i_g^*>0$, determining that the $v_r^*$ and the $i_g^*$ are in an operation range II;

when $v_r^*<0$ and $i_g^*<0$, determining that the $v_r^*$ and the $i_g^*$ are in an operation range III; or when $v_r^*>0$ and $i_g^*<0$, determining that the $v_r^*$ and the $i_g^*$ are in an operation range IV, where switch states are I1 to I6 in the operation range I, II1 to II6 in the operation range II, III1 to III6 in the operation range III, and IV1 to IV6 in the operation range IV.

In step 3, when a voltage sensor of power module 2 is faulty, the DC voltage sensor is modulated based on the voltage modulated wave $v_r^*$ and the difference between the $v_{dc1}$ and the $v_{dc3}$, which specifically includes:

in the operation range I, obtaining the difference between the $v_{dc1}$ and the $v_{dc3}$ according to $\Delta v_{dc} = v_{dc1} - v_{dc3}$; and when $0 < v_r^* < 1$, selecting switch states I1 and I3 for switching when $\Delta v_{dc} > 0$, or selecting switch states I2 and I3 for switching when $\Delta v_{dc} < 0$; when $1 < v_r^* < 2$, selecting switch states I4 and I3 for switching when $\Delta v_{dc} > 0$, or selecting switch states I5 and I3 for switching when $\Delta v_{dc} < 0$; or when $2 < v_r^* < 3$, selecting switch states I4 and I6 for switching when $\Delta v_{dc} > 0$, or selecting switch states I5 and I6 for switching when $\Delta v_{dc} < 0$;

in the operation range II, when $-1 < v_r^* < 0$, selecting switch states II1 and II3 for switching when $\Delta v_{dc} > 0$, or selecting switch states II2 and II3 for switching when $\Delta v_{dc} < 0$; when $-2 < v_r^* < -1$, selecting switch states II4 and II3 for switching when $\Delta v_{dc} > 0$, or selecting switch states II5 and II3 for switching when $\Delta v_{dc} < 0$; or when $-3 < v_r^* < -2$, selecting switch states II4 and II6 for switching when $\Delta v_{dc} > 0$, or selecting switch states II5 and II6 for switching when $\Delta v_{dc} < 0$;

in the operation range III, when $-1 < v_r^* < 0$, selecting switch states III1 and III3 for switching when $\Delta v_{dc} > 0$, or selecting switch states III2 and III3 for switching when $\Delta v_{dc} < 0$; when $-2 < v_r^* < -1$, selecting switch states III4 and III3 for switching when $\Delta v_{dc} > 0$, or selecting switch states III5 and III3 for switching when $\Delta v_{dc} < 0$; or when $-3 < v_r^* < -2$, selecting switch states III4 and III6 for switching when $\Delta v_{dc} > 0$, or selecting switch states III5 and III6 for switching when $\Delta v_{dc} < 0$; and in the operation range IV, when $0 < v_r^* < 1$, selecting switch states IV1 and IV3 for switching when $\Delta v_{dc} > 0$, or selecting switch states IV2 and IV3 for switching when $\Delta v_{dc} < 0$; when $1 < v_r^* < 2$, selecting switch states IV4 and IV3 for switching when $\Delta v_{dc} > 0$, or selecting switch states IV5 and IV3 for switching when $\Delta v_{dc} < 0$; or when $2 < v_r^* < 3$, selecting switch states IV4 and IV6 for switching when $\Delta v_{dc} > 0$, or selecting switch states IV5 and IV6 for switching when $\Delta v_{dc} < 0$.

In summary, with the aforementioned technical solutions, the present disclosure achieves the following beneficial effects:

The present disclosure provides a modulation method for a DC coupling converter with less DC voltage sensors. When an intermediate DC-side voltage sensor is removed, DC voltages of various modules of a converter system of a DC coupling power unit can still be balanced, and quality of a grid-connected current is not affected by a fault, thus realizing normal operation when there are less DC voltage sensors.

BRIEF DESCRIPTION OF THE DRAWINGS

To describe the technical solutions in the embodiments of the present disclosure more clearly, the accompanying drawings required for describing the embodiments are briefly described below. It should be understood that the following accompanying drawings show merely some embodiments of the present disclosure, and thus should not be regarded as a limitation to the scope. A person of ordinary skill in the art may still derive other related accompanying drawings from these accompanying drawings without creative efforts. The scaling relation of each component in the accompanying drawings of this specification does not represent the scaling relation in actual material selection and design, and it is only a schematic diagram of a structure or location.

FIG. 1 is a schematic flowchart according to the present disclosure;

DETAILED DESCRIPTION

To make the objectives, technical solutions, and advantages of the present disclosure clearer, the present disclosure is further described below in detail with reference to the accompanying drawings and embodiments. It should be understood that the specific embodiments described herein are only used to explain the present disclosure, but not to limit the present disclosure. That is, the described embodiments are only some rather than all embodiments of the present disclosure. Generally, components of the embodiments of the present disclosure described and shown in the accompanying drawings may be arranged and designed in various manners.

It should be noted that terms "including", "comprising" or any other variants thereof are intended to cover non-exclusive inclusion, so that a process, method, article or device including a series of elements includes not only those elements but also other elements not explicitly listed, or elements inherent to such a process, method, article, or device.

Therefore, the following detailed description of the embodiments of the present disclosure in the accompanying drawings is not intended to limit the protection scope of the present disclosure, but merely indicates selected embodiments of the present disclosure. All other embodiments obtained by a person skilled in the art based on the embodiments of the present disclosure without creative effort shall fall within the protection scope of the present disclosure.

Except contradictory features and/or steps, all features, methods, or steps in a process which are disclosed in this specification can be combined in any manner.

The present disclosure will be explained in detail below with reference to the accompanying drawings.

A specific embodiment is implemented as follows:

The present disclosure provides a modulation method for a DC coupling converter with less DC voltage sensors, where the DC coupling converter 5 includes three power modules. As shown in FIG. 1, the modulation method specifically includes the following steps.

Figure 2:
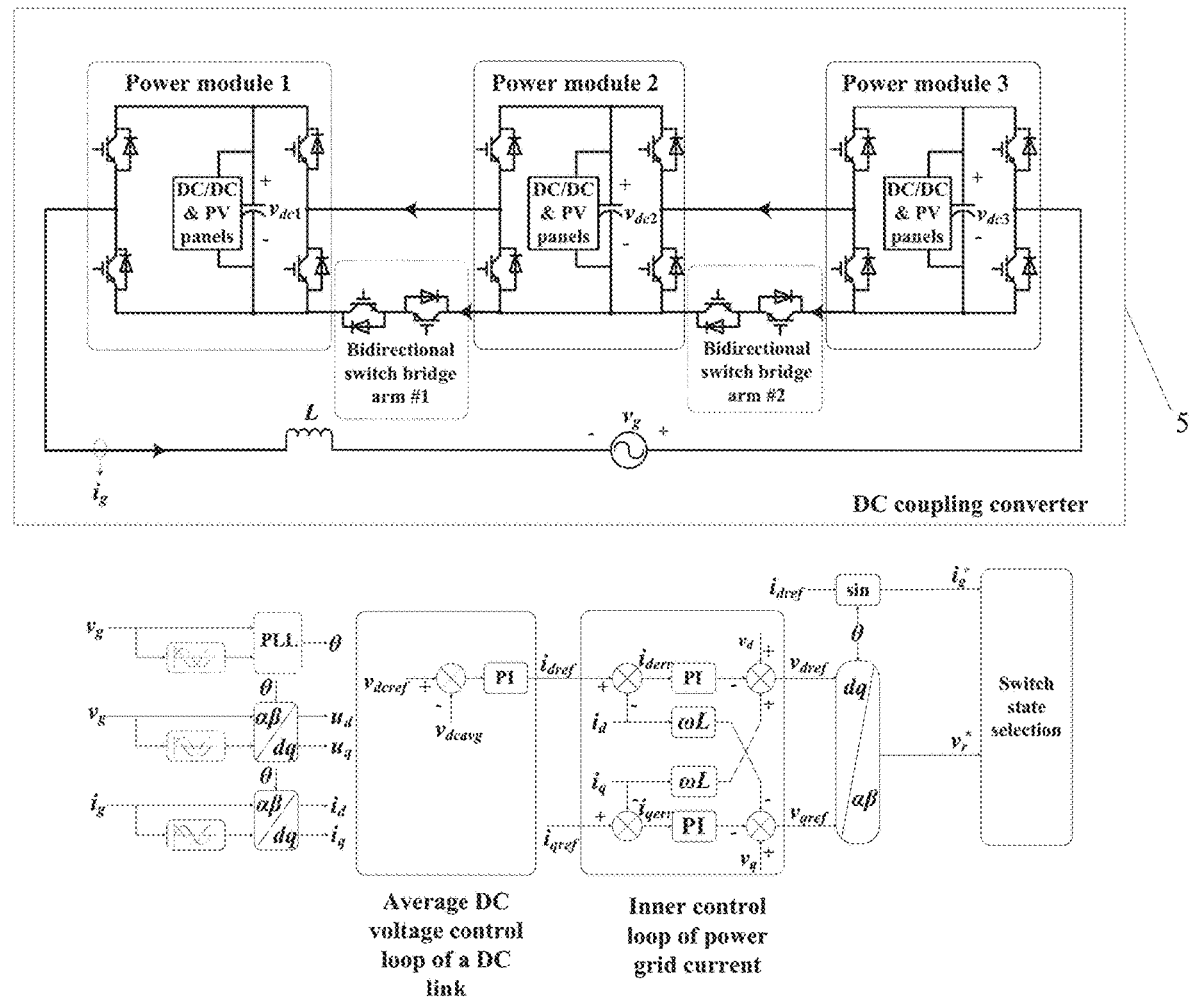
FIG. 2 is a control block diagram of generating $v_r^*$ and $i_g^*$ by a DC coupling power converter according to the present disclosure.

Step 1: Obtain a voltage modulated wave $v_r^*$ and a current reference value $i_g^*$ of the DC coupling converter 5, as shown in FIG. 2.

In step 1, the obtaining a voltage modulated wave $v_r^*$ and a current reference value $i_g^*$ specifically includes:

Step 11: Obtain a phase signal $\theta$ of a power grid by performing phase locking on a voltage $v_g$ of the power grid, where the three power modules of the DC coupling converter 5 are a power module 1, a power module 2, and a power module 3, and DC-side voltages of the power module 1, the power module 2, and the power module 3 are $v_{dc1}$, $v_{dc2}$, and $v_{dc3}$ respectively.

Step 12: Perform αβ/dq transformation on phase signals θ of the voltage $v_g$ of the power grid and a current $i_g$ of the power grid to obtain an active component $v_d$ and a reactive component $v_q$ of the $v_g$, and an active component ia and a reactive component $i_q$ of the $i_g$.

Step 13: Converge, by an average DC voltage control loop of a DC link of the DC coupling converter 5, an average value $v_{dcavg}$ of an outer loop voltage to a reference value $v_{dcref}$; after performing a subtraction on the reference value $v_{dcref}$ and the average value $_{dcavg}$, obtain, by using a PI controller, a reference value $i_{dref}$ of the active component of the current $i_g$ of the power grid; and obtain the current reference value $i_g^*$ after making the $i_{dref}$ and a phase of the power grid sinusoidal.

Step 14: After performing a differential operation on the $i_{dref}$ and the ia, obtain an active power error $i_{derr}$ of the current by using the PI controller, and add up the $i_{derr}$, the $v_d$, and $i_q^*\omega L$ to obtain a d-axis component $v_{qref}$ of the voltage modulated wave, where ω represents an angular frequency of the power grid, and L represents grid-connected filtering inductance.

Step 15: Obtain, by using the IP controller, a reactive power error $i_{qerr}$ of the current based on a difference between $i_{qref}$ and $i_q$, and add up the $i_{qerr}$, the $v_q$, and $i_d^*\omega L$ to obtain a q-axis component $v_{qref}$ of the voltage modulated wave.

Step 16: Perform dq/αβ transformation on the $v_{qref}$ and the $v_{qref}$ to obtain the voltage modulated wave $v_r^*$.

Step 2: Perform determination on the voltage modulated wave $v_r^*$ and the current reference value $i_g^*$ in step 1, and determine a switch state of the DC coupling converter 5 based on a result of the determination.

In step 2, the performing determination on the voltage modulated wave $v_r^*$ and the current reference value $i_g^*$, and determining a switch state of the DC coupling converter 5 based on a result of the determination specifically includes:

when $v_r^*>0$ and $i_g^*>0$, determining that the $v_r^*$ and the $i_g^*$ are in an operation range I;

when $v_r^*<0$ and $i_g^*>0$, determining that the $v_r^*$ and the $i_g^*$ are in an operation range II;

when $v_r^*<0$ and $i_g^*<0$, determining that the $v_r^*$ and the $i_g^*$ are in an operation range III; or when $v_r^*>0$ and $i_g^*<0$, determining that the $v_r^*$ and the $i_g^*$ are in an operation range IV.

Figure 3:
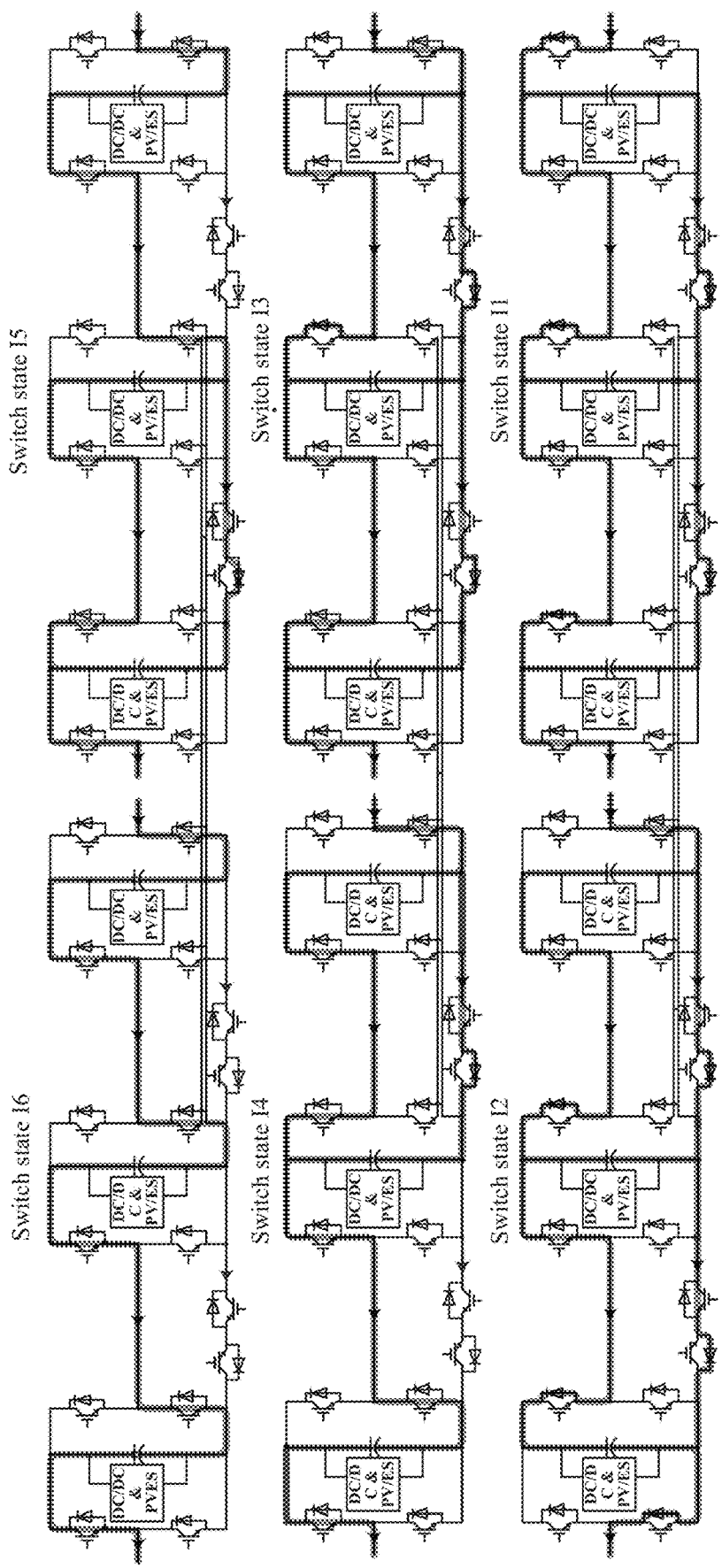
FIG. 3 shows switch states when $v_r^*$ and $i_g^*$ are in an operation range I according to the present disclosure.
Figure 4:
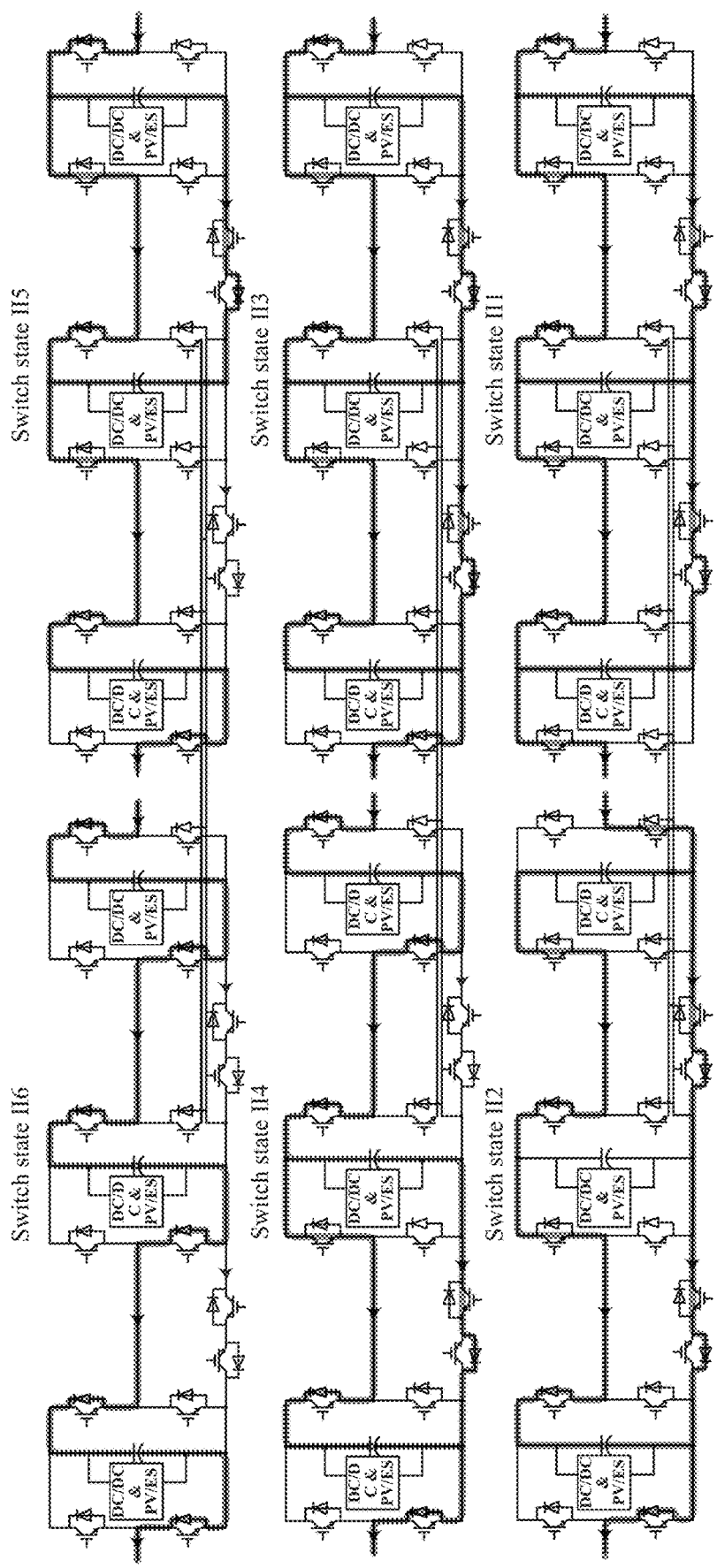
FIG. 4 shows switch states when $v_r^*$ and $i_g^*$ are in an operation range II according to the present disclosure.
Figure 5:
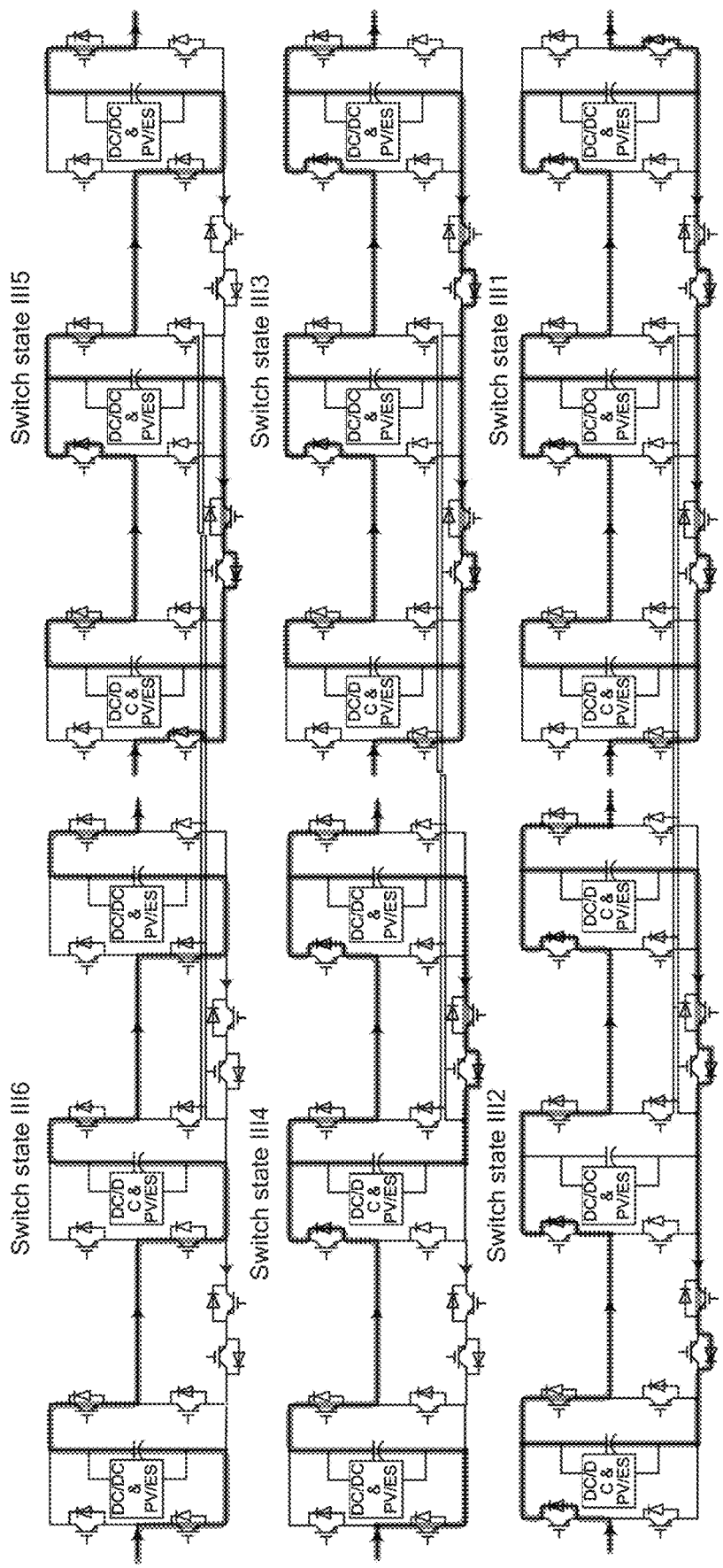
FIG. 5 shows switch states when $v_r^*$ and $i_g^*$ are in an operation range III according to the present disclosure.
Figure 6:
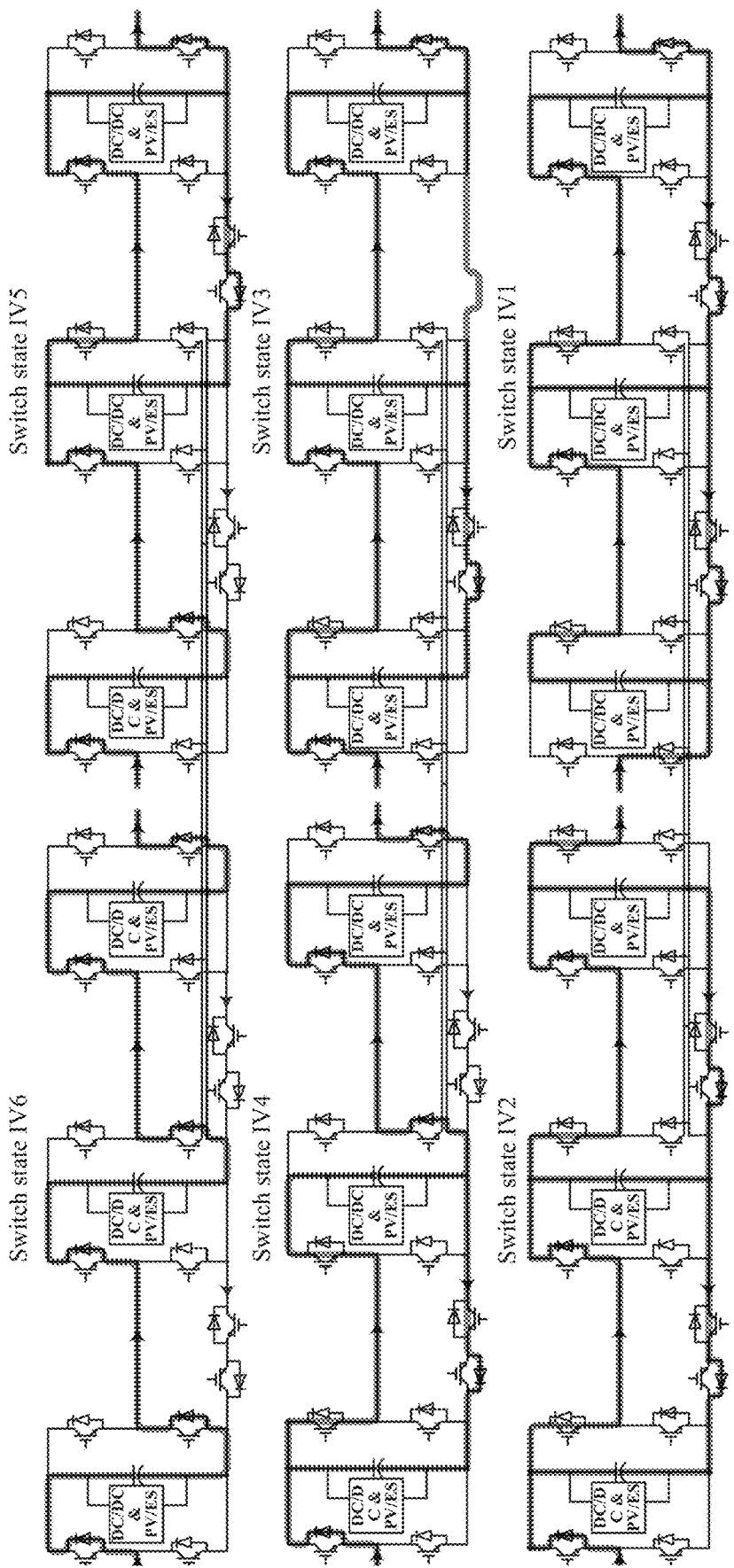
FIG. 6 shows switch states when $v_r^*$ and $i_g^*$ are in an operation range IV according to the present disclosure.

As shown in FIG. 3, switch states in the operation range I are I1 to I6. As shown in FIG. 4, switch states in the operation range II are II1 to II6. As shown in FIG. 5, switch states in the operation range III are III1 to III6. As shown in FIG. 6, switch states in the operation range IV are IV1 to IV6.

Step 3: When a DC voltage sensor of an electrolytic capacitor of an intermediate power module is removed, modulate a DC voltage sensor based on the voltage modulated wave $v_r^*$ and a difference between DC voltages on electrolytic capacitors of the other two power modules.

In step 3, when a voltage sensor of power module 2 is faulty, the DC voltage sensor is modulated based on the voltage modulated wave $v_r^*$ and the difference between the $v_{dc1}$ and the $v_{dc3}$, which specifically includes:

in the operation range I, obtaining the difference between the $v_{dc1}$ and the $v_{dc3}$ according to $\Delta v_{dc}=v_{dc1}-v_{dc3}$; and when $0<v_r^*<1$, selecting switch states I1 and I3 for switching when $\Delta v_{dc}>0$, or selecting switch states I2 and I3 for switching when $\Delta v_{dc}<0$; when $1<v_r^*<2$, selecting switch states I4 and I3 for switching when $\Delta v_{dc}>0$, or selecting switch states I5 and I3 for switching when $\Delta v_{dc}<0$; or when $2<v_r^*<3$, selecting switch states I4 and I6 for switching when $\Delta v_{dc}>0$, or selecting switch states I5 and I6 for switching when $\Delta v_{dc}<0$;

in the operation range II, when $-1<v_r^*<0$, selecting switch states II1 and II3 for switching when $\Delta v_{dc}>0$, or selecting switch states II2 and II3 for switching when $\Delta v_{dc}<0$; when $-2<v_r^*<-1$, selecting switch states II4 and II3 for switching when $\Delta v_{dc}>0$, or selecting switch states II5 and II3 for switching when $\Delta v_{dc}<0$; or when $-3<v_r^*<-2$, selecting switch states II4 and II6 for switching when $\Delta v_{dc}>0$, or selecting switch states II5 and II6 for switching when $\Delta v_{dc}<0$;

in the operation range III, when $-1<v_r^*<0$, selecting switch states III1 and III3 for switching when $\Delta v_{dc}>0$, or selecting switch states III2 and III3 for switching when $\Delta v_{dc}<0$; when $-2<v_r^*<-1$, selecting switch states III4 and III3 for switching when $\Delta v_{dc}>0$, or selecting switch states III5 and III3 for switching when $\Delta v_{dc}<0$; or when $-3<v_r^*<-2$, selecting switch states III4 and III6 for switching when $\Delta v_{dc}>0$, or selecting switch states III5 and III6 for switching when $\Delta v_{dc}<0$; and in the operation range IV, when $0<v_r^*<1$, selecting switch states IV1 and IV3 for switching when $\Delta v_{dc}>0$, or selecting switch states IV2 and IV3 for switching when $\Delta v_{dc}<0$; when $1<v_r^*<2$, selecting switch states IV4 and IV3 for switching when $\Delta v_{dc}>0$, or selecting switch states IV5 and IV3 for switching when $\Delta v_{dc}<0$; or when $2<v_r^*<3$, selecting switch states IV4 and IV6 for switching when $\Delta v_{dc}>0$, or selecting switch states IV5 and IV6 for switching when $\Delta v_{dc}<0$.

Embodiment 1

This embodiment simulates four working conditions. As shown in Table 2, power generated by three power modules under working condition 1 is equal, and PV power under working conditions 2, 3, and 4 does not match. Parameters of a DC coupling converter are shown in Table 1.

| | Parameter | Symbol | Value |
|---|---|---|---|
| Power grid | Phase voltage (amplitude/frequency) | $v_g/f_g$ | 90 V/50 Hz |
| DC coupling converter | Capacitor voltage | $v_{dcj}$ | 40 V |
| | Capacitance of a DC link | $C_{dcj}$ | 940 μF |
| | Filter inductance | $L_f$ | 5 mH |
| | Switch frequency | $f_{sw}$ | 10 kHz |
| Bidirectional switch bridge arm | Capacitance of a PV port | $C_{pvj}$ | 940 μF |
| | Voltage of the PV port | $v_{pvj}$ | 30 V |
| | Switch frequency | $f_{dab}$ | 30 kHz |
| | Turn ratio of a high-frequency transformer | $n_h$ | 6:1 |
| | Leakage inductance | $L_p$ | 100 μH |

TABLE 1

Simulation parameters

| PV module | Working condition 1 | Working condition 2 | Working condition 3 | Working condition 4 |
|---|---|---|---|---|
| PV #1 | 1.0 p.u. (100 W) | 1.0 p.u. | 1.0 p.u. | 0.6 p.u. |
| PV #2 | 1.0 p.u. | 0.6 p.u. | 0.6 p.u. | 1.0 p.u. |
| PV #3 | 1.0 p.u. | 0.6 p.u. | 0.28 p.u. | 0.6 p.u. |

Table 2 Four Simulated Working Conditions

Figure 7A:
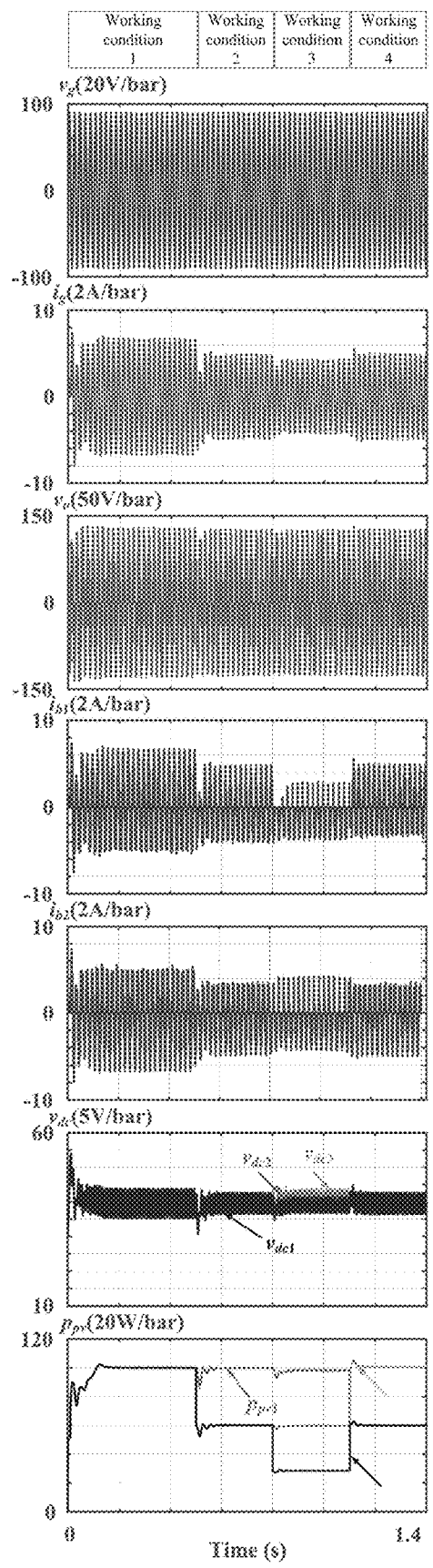
FIG. 7 (*a*), FIG. 7 (*b*), FIG. 7 (*c*), and FIG. 7 (*d*) are simulated waveform graphs of a converter of a DC coupling power unit according to the present disclosure.
Figures 7B, 7C, 7D:
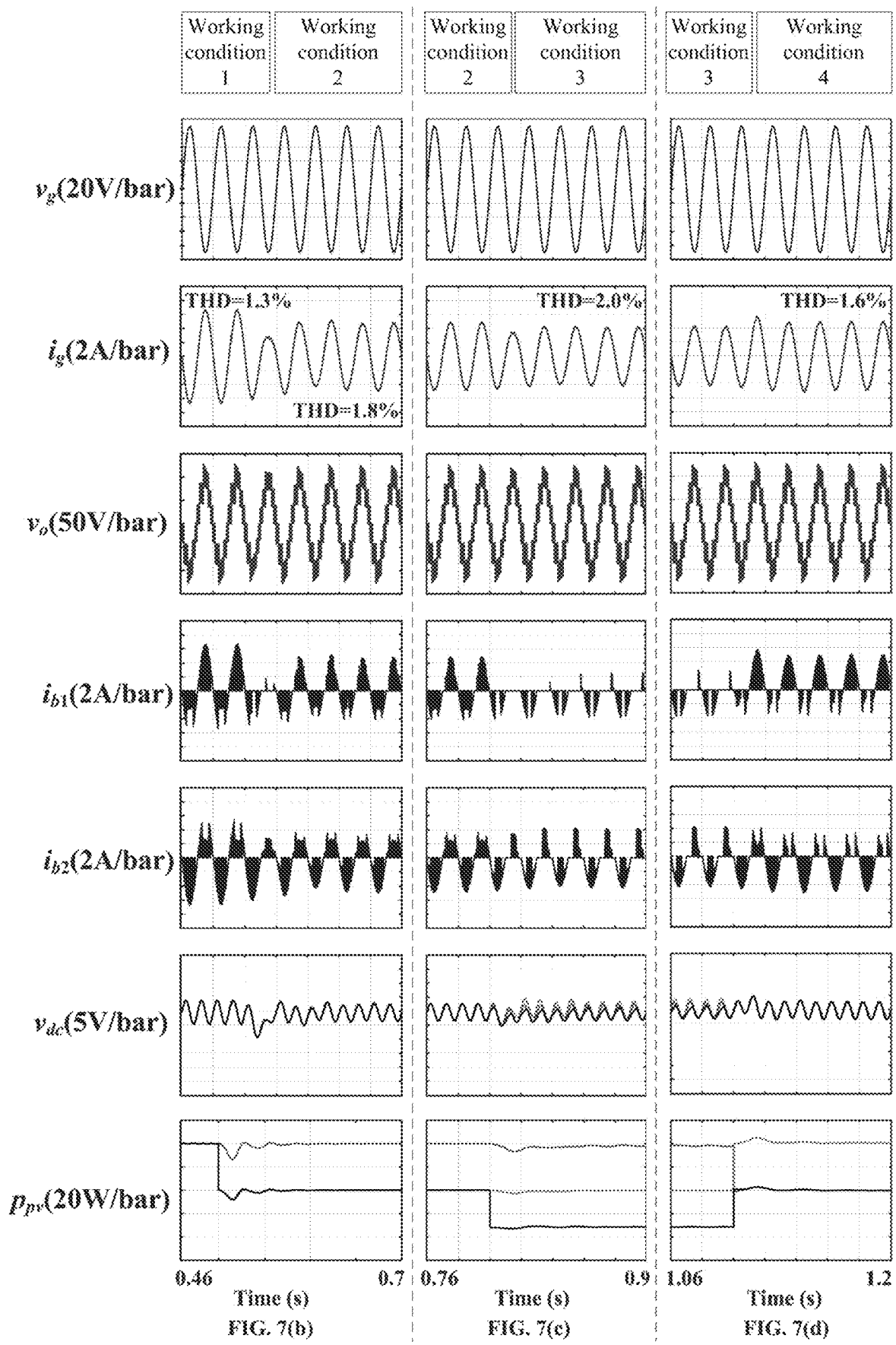

FIG. 7 (a) shows a simulated waveform of an electricity quantity of each part in a system. The waveform is composed of a voltage $v_g$ of a power grid, a current $i_g$ of the power grid, a voltage $v_o$ of an output port, a current $i_{b1}$ of bidirectional switch bridge arm #1, a current $i_{b2}$ of bidirectional switch bridge arm #2, three DC-side voltages $v_{dc1}$ to $v_{dc3}$, and power of the three power modules, namely, $p_{pv1}$ to $p_{pv3}$, from top to bottom. FIG. 7 (b) to FIG. 7 (d) show transient amplified waveforms under working conditions 1 to 4.

Before 0.5 s, the system operates under working condition 1. Since the power generated by the power modules is the same, the current of the power grid is in phase with the voltage of the power grid, total harmonic distortion (THD) of the current is 2.1%, operation based on a unit power factor is realized on the power grid side, a 7-level voltage is generated on an output terminal of the converter, and three DC-side voltage waveforms coincide with each other. In this case, bidirectional switch bridge arms #1 and #2 transmit active power in positive and negative half cycles.

At 0.5 s, the system operates under working condition 2, and both active power of power module 2 and active power of power module 3 decrease from 100 W (1.0 p.u.) to 60 W (0.6 p.u.). As shown in FIG. 7 (b), because total power of the system decreases, a current amplitude of the power grid decreases, and the current and the voltage of the power grid return to normal in one fundamental cycle after being decreased.

At 0.8 s, the system operates under working condition 3, and the active power of the power module 3 decrease from 60 W (0.6 p.u.) to 28 W (0.28 p.u.). As shown in FIG. 7 (c), the total power of the system decreases, which further decreases the current amplitude of the power grid. Module 1 has largest power. As a result, a capacitor charging current to $C_{dc1}$ is large, and a voltage ripple amplitude of the $v_{dc1}$ is slightly greater than voltage ripple amplitudes of the $v_{dc2}$ and the $v_{dc3}$. Therefore, as shown in FIG. 7 (c), power transmitted by bidirectional switch bridge arm #1 in a positive half cycle of the current of the power grid is less than that transmitted in a negative half cycle of the current of the power grid.

At 1.1 s, the system operates under working condition 4. Total power of the system under working condition 4 is the same as that under working condition 2. As shown in FIG. 7 (d), since $p_{pv1}=p_{pv3}<p_{pv2}$, switching time of bidirectional switch bridge arm #1 in the positive half cycle of the current of the power grid is greater than that in the negative half cycle of the current of the power grid, and power transmitted in the positive half cycle of the current of the power grid is greater than that transmitted in the negative half cycle of the current of the power grid. However, power transmitted by bidirectional switch bridge arm #2 in the positive half cycle of the current of the power grid is less than that transmitted in the negative half cycle of the current of the power grid.

Under any of the above working conditions, the system can operate normally with less DC voltage sensors.

The above described are merely preferred implementations of the present disclosure, and the protection scope of the present disclosure is not limited thereto. Any modification or replacement easily conceived by those skilled in the art within the technical scope of the present disclosure should fall within the protection scope of the present disclosure. Therefore, the protection scope of the present disclosure should be subject to the protection scope defined by the claims.

The invention claimed is:

1. A modulation method for a direct current (DC) coupling converter with less DC voltage sensors, wherein the DC coupling converter comprises three power modules, and the modulation method specifically comprises the following steps:

step 1: obtaining a voltage modulated wave $v_r^*$ and a current reference value $i_g^*$ of the DC coupling converter;

step 2: performing determination on the voltage modulated wave $v_r^*$ and the current reference value $i_g^*$ in step 1, and determining a switch state of the DC coupling converter based on a result of the determination; and step 3: when a DC voltage sensor of an electrolytic capacitor of an intermediate power module is removed, modulating a DC voltage sensor based on the voltage modulated wave $v_r^*$ and a difference between DC voltages on electrolytic capacitors of the other two power modules;

wherein in step 1, the obtaining a voltage modulated wave $v_r^*$ and a current reference value $i_g^*$ specifically comprises:

step 11: obtaining a phase signal θ of a power grid by performing phase locking on a voltage $v_g$ of the power grid, wherein the three power modules of the DC coupling converter are a power module 1, a power module 2, and a power module 3, and DC-side voltages of the power module 1, the power module 2, and the power module 3 are $v_{dc1}$, $v_{dc2}$, and $v_{dc3}$ respectively;

step 12: performing αβ/dq transformation on phase signals θ of the voltage $v_z$ of the power grid and a current $i_g$ of the power grid to obtain an active component $v_d$ and a reactive component $v_q$ of the $v_z$, and an active component $i_d$ and a reactive component $i_q$ of the $i_g$;

step 13: converging, by an average DC voltage control loop of a DC link of the DC coupling converter, an average value $v_{dcavg}$ of an outer loop voltage to a reference value $v_{dcref}$ after performing a subtraction on the reference value $v_{dcref}$ and the average value $d_{cavg}$, obtaining, by using a proportional Integral (PI) controller, a reference value $i_{dref}$ of the active component of the current $i_g$ of the power grid; and obtaining the current reference value $i_g^*$ after making the $i_{dref}$ and a phase of the power grid sinusoidal;

step 14: after performing a differential operation on the $i_{dref}$ and the $i_d$, obtaining an active power error $i_{derr}$ of the current by using the PI controller, and adding up the $i_{derr}$, the $v_d$, and $i_q^*\omega L$ to obtain a d-axis component $v_{dref}$ of the voltage modulated wave, wherein ω represents an angular frequency of the power grid, and L represents grid-connected filtering inductance;

step 15: obtaining by using the PI controller, a reactive power error $i_{qerr}$ of the current based on a difference between $i_{qref}$ and $i_q$, and adding up the $i_{qerr}$, the $v_q$, and $i_d^*\omega L$ to obtain a q-axis component $v_{qref}$ of the voltage modulated wave; and step 16: performing dq/αβ transformation on the $v_{dref}$ and the $v_{qref}$ to obtain the voltage modulated wave $v_r^*$;

wherein in step 2, the performing determination on the voltage modulated wave $v_r^*$ and the current reference value $i_g^*$, and determining a switch state of the DC coupling converter based on a result of the determination specifically comprises:

when $v_r^*>0$ and $i_g^*>0$, determining that the $v_r^*$ and the $i_g^*$ are in an operation range I;

when $v_r^*<0$ and $i_g^*>0$, determining that the $v_r^*$ and the $i_g^*$ are in an operation range II;

when $v_r^*<0$ and $i_g^*<0$, determining that the $v_r^*$ and the $i_g^*$ are in an operation range III; or when $v_r^*>0$ and $i_g^*<0$, determining that the $v_r^*$ and the $i_g^*$ are in an operation range IV, wherein switch states are I1 to I6 in the operation range I, II1 to II6 in the operation range II, III1 to III6 in the operation range III, and IV1 to IV6 in the operation range IV;

wherein in step 3, when a voltage sensor of the power module 2 is faulty, the DC voltage sensor is modulated based on the voltage modulated wave $v_r^*$ and a difference between the $v_{dc1}$ and the $v_{dc3}$, which specifically comprises:

in the operation range I, obtaining the difference between the $v_{dc1}$ and the $v_{dc3}$ according to $\Delta v_{dc}=v_{dc1}-v_{dc3}$; and when $0<v_r^*<1$, selecting switch states I1 and I3 for switching when $\Delta v_{dc}>0$, or selecting switch states I2 and I3 for switching when $\Delta v_{dc}<0$; when $1<v_r^*<2$, selecting switch states I4 and I3 for switching when $\Delta v_{dc}>0$, or selecting switch states I5 and I3 for switching when $\Delta v_{dc}<0$; or when $2<v_r^*<3$, selecting switch states I4 and I6 for switching when $\Delta v_{dc}>0$, or selecting switch states I5 and I6 for switching when $\Delta v_{dc}<0$.

2. The modulation method for a DC coupling converter with less DC voltage sensors according to claim 1, wherein in step 3, when a voltage sensor of the power module 2 is faulty, the DC voltage sensor is modulated based on the voltage modulated wave $v_r^*$ and a difference between the $v_{dc1}$ and the $v_{dc3}$, which specifically comprises:

in the operation range II, when $-1<v_r^*<0$, selecting switch states II1 and II3 for switching when $\Delta v_{dc}>0$, or selecting switch states II2 and II3 for switching when $\Delta v_{dc}<0$; when $-2<v_r^*<-1$, selecting switch states II4 and II3 for switching when $\Delta v_{dc}>0$, or selecting switch states II5 and II3 for switching when $\Delta v_{dc}<0$; or when $-3<v_r^*<-2$, selecting switch states II4 and II6 for switching when $\Delta v_{dc}>0$, or selecting switch states II5 and II6 for switching when $\Delta v_{dc}<0$.

3. The modulation method for a DC coupling converter with less DC voltage sensors according to claim 1, wherein in step 3, when a voltage sensor of the power module 2 is faulty, the DC voltage sensor is modulated based on the voltage modulated wave $v_r^*$ and a difference between the $v_{dc1}$ and the $v_{dc3}$, which specifically comprises:

in the operation range III, when $-1<v_r^*<0$, selecting switch states III1 and III3 for switching when $\Delta v_{dc}>0$, or selecting switch states III2 and III3 for switching when $\Delta v_{dc}<0$; when $-2<v_r^*<-1$, selecting switch states III4 and III3 for switching when $\Delta v_{dc}>0$, or selecting switch states III5 and III3 for switching when $\Delta v_{dc}<0$; or when $-3<v_r^*<-2$, selecting switch states III4 and III6 for switching when $\Delta v_{dc}>0$, or selecting switch states III5 and III6 for switching when $\Delta v_{dc}<0$.

4. The modulation method for a DC coupling converter with less DC voltage sensors according to claim 1, wherein in step 3, when a voltage sensor of the power module 2 is faulty, the DC voltage sensor is modulated based on the voltage modulated wave $v_r^*$ and a difference between the $v_{dc1}$ and the $v_{dc3}$, which specifically comprises:

in the operation range IV, when $0<v_r^*<1$, selecting switch states IV1 and IV3 for switching when $\Delta v_{dc}>0$, or selecting switch states IV2 and IV3 for switching when $\Delta v_{dc}<0$; when $1<v_r^*<2$, selecting switch states IV4 and IV3 for switching when $\Delta v_{dc}>0$, or selecting switch states IV5 and IV3 for switching when $\Delta v_{dc}<0$; or when $2<v_r^*<3$, selecting switch states IV4 and IV6 for switching when $\Delta v_{dc}>0$, or selecting switch states IV5 and IV6 for switching when $\Delta v_{dc}<0$.

* * * * *